United States Patent
Davidson

(10) Patent No.: US 8,181,122 B2
(45) Date of Patent: May 15, 2012

(54) GRAPHICAL USER INTERFACE FOR LARGE-SCALE, MULTI-USER, MULTI-TOUCH SYSTEMS

(75) Inventor: Philip L. Davidson, Bronx, NY (US)

(73) Assignee: Perceptive Pixel Inc., New York, NY (US)

( * ) Notice: Subject to any disclaimer, the term of this patent is extended or adjusted under 35 U.S.C. 154(b) by 918 days.

(21) Appl. No.: 12/182,385

(22) Filed: Jul. 30, 2008

(65) Prior Publication Data

US 2009/0193366 A1    Jul. 30, 2009

Related U.S. Application Data

(60) Provisional application No. 60/952,679, filed on Jul. 30, 2007.

(51) Int. Cl.
*G06F 3/01* (2006.01)
*G06F 3/048* (2006.01)

(52) U.S. Cl. ......... 715/863; 715/810; 715/702; 345/173

(58) Field of Classification Search .................. 715/702, 715/764, 765, 810, 861, 863, 864; 345/473, 345/169, 173
See application file for complete search history.

(56) References Cited

U.S. PATENT DOCUMENTS

| | | | | |
|---|---|---|---|---|
| 5,404,439 | A * | 4/1995 | Moran et al. .................. | 715/814 |
| 7,844,915 | B2 * | 11/2010 | Platzer et al. ................. | 715/781 |
| 7,966,577 | B2 * | 6/2011 | Chaudhri et al. ............. | 715/835 |
| 7,971,152 | B2 * | 6/2011 | Jensen et al. .................. | 715/780 |
| 2002/0015064 | A1 * | 2/2002 | Robotham et al. ............ | 345/863 |
| 2004/0095395 | A1 * | 5/2004 | Kurtenbach .................. | 345/810 |
| 2005/0066291 | A1 * | 3/2005 | Lewak .......................... | 715/810 |
| 2005/0212760 | A1 * | 9/2005 | Marvit et al. ................. | 345/156 |
| 2005/0267676 | A1 * | 12/2005 | Nezu et al. .................... | 701/200 |
| 2006/0085767 | A1 * | 4/2006 | Hinckley et al. ............. | 715/863 |
| 2007/0040813 | A1 * | 2/2007 | Kushler et al. ................ | 345/173 |
| 2007/0168890 | A1 * | 7/2007 | Zhao et al. .................... | 715/863 |
| 2008/0143975 | A1 * | 6/2008 | Dennard et al. ............... | 353/42 |
| 2010/0073567 | A1 * | 3/2010 | Lee et al. ...................... | 348/569 |
| 2011/0310064 | A1 * | 12/2011 | Keski-Jaskari et al. ....... | 345/178 |

* cited by examiner

*Primary Examiner* — Xiomar L Bautista
(74) *Attorney, Agent, or Firm* — Fish & Richardson P.C.

(57) ABSTRACT

A method implemented on the graphical user interface device to invoke an independent, user-localized menu in an application environment, by making a predetermined gesture with a pointing device on an arbitrary part of a display screen or surface, especially when applied in a multi-touch, multi-user environment, and in environments where multiple concurrent pointing devices are present. As an example, the user may trace out a closed loop of a specific size that invokes a default system menu at any location on the surface, even when a second user may be operating a different portion of the system elsewhere on the same surface. As an additional aspect of the invention, the method allows the user to smoothly transition between the menu-invocation and menu control.

37 Claims, 6 Drawing Sheets

GRAPHICAL USER INTERFACE FOR LARGE-SCALE, MULTI-USER, MULTI-TOUCH SYSTEMS

REFERENCE TO RELATED APPLICATION

This application claims priority to U.S. Provisional Patent Application No. 60/952,679, filed Jul. 30, 2007, the disclosure of which is incorporated herein by reference.

BACKGROUND OF THE INVENTION

1. Field of the Invention

The present invention pertains to a graphical user interface (GUI) for a multi-touch system, and is particularly well suited in a large scale, multi-user setting.

2. Description of the Related Art

Large-scale digital display systems and multi-user interface technologies, particularly multi-touch systems, create a practical environment for rich collaborative workspaces, in which two or more users may work side-by-side at the same display. Unfortunately, traditional graphical user interface practices (both desktop window management and application user interface (UI)) do not translate well to or are otherwise ill-suited for large displays and multi-user environments.

For large-scale, multi-user computing environments, it is impractical to assign certain interface elements, such as a "Start" button, to a corner of the screen or a horizontal (or vertical) menu to the edges of the screen, as is common practice on desktop systems, because those areas of the display can be out-of-reach. Users require the ability to access and activate common system functions without leaving their current location or interrupting the workspace of other users. Simply making these types of buttons or menus larger or present in many locations on a large-scale display represents ineffective use of screen real estate.

In view of the foregoing, new interaction models are needed.

SUMMARY OF THE INVENTION

In accordance with the present invention, a method of invoking a control element on a display device is provided that comprises the steps of generating by a user a stroke on a display device using a moving pointer element; ascertaining, during generation of the stroke, if the stroke corresponds to a predetermined shape; and invoking a control element after ascertaining that the stroke corresponds to the predetermined shape, the invoked control element being displayed on the display device.

As an aspect of the invention, the display device is a touch sensitive display device and the generating step comprises generating by the user the stroke on the display device by actuating the touch sensitive display device.

As a further aspect of the invention, the predetermined shape is a closed loop.

As another aspect of the invention, the predetermined shape is a signature shape associated with the user.

As an additional aspect of the invention, the stroke generated by the user is a subsection of a continuous sequence of input by the user using the moving pointer element.

As yet a further aspect of the invention, the generating step comprises generating by at least one user a plurality of strokes on the display device, each of the strokes using a respective moving pointing element.

As yet another aspect of the invention, after ascertaining that the stroke corresponds to the predetermined shape(s), the method includes conducting a secondary analysis of a characteristic of the stroke; and wherein the invoking step comprises invoking a first control element or a second control element based on results of the conducted secondary analysis.

As yet an additional aspect of the invention, the ascertaining step comprises ascertaining if the stroke corresponds to either a first predetermined shape or a second predetermined shape; and the invoking step comprises invoking a first control element after ascertaining that the stroke corresponds to the first predetermined shape and invoking a second control element after ascertaining that the stroke corresponds to the second predetermined shape.

As a further aspect of the invention, the ascertaining step also ascertains a direction of travel of the stroke; and the invoking step comprises invoking a first control element after ascertaining that the stroke corresponds to a predetermined shape with a measurable clockwise or counterclockwise winding, (e.g. a closed polygon or loop) and the ascertained direction of travel corresponds to a clockwise direction, and invoking a second control element after ascertaining that the stroke corresponds to the predetermined shape and the ascertained direction of travel corresponds to a counter-clockwise direction.

As another aspect of the invention, the method includes the steps of recognizing, during generation of the stroke, if the generated stroke corresponds to a substantial portion of the predetermined shape; and providing audiovisual feedback on the display corresponding to at least a portion of the generated stroke if the generated stroke is recognized to correspond to said substantial portion of the predetermined shape, the audiovisual feedback identifying to the user that the stroke being generated corresponds to a partial amount of the predetermined shape.

As an additional aspect of the invention, the ascertaining step comprises ascertaining if the stroke corresponds to a predetermined shape and is within a predetermined size threshold; and the invoking step comprises invoking the control element after ascertaining that the stroke corresponds to the predetermined shape and the stroke is within the predetermined size threshold.

As yet another aspect of the invention, the generating step comprises generating by a plurality of users respective strokes on said display device; the ascertaining step comprises ascertaining, for each of the strokes being generated, if the respective stroke corresponds to the predetermined shape; and the invoking step comprises invoking the control element for each ascertained stroke that corresponds to the predetermined shape.

As yet a further aspect of the invention, the invoking step comprises invoking, after ascertaining that the stroke corresponds to the predetermined shape, a control element that corresponds to the environment on the display device disposed at a position of the moving point element used to generate the stroke.

As another aspect of the invention, the invoking step comprises displaying the control element at a center of the stroke that corresponds to the predetermined shape.

As a further aspect of the invention, the invoking step comprises displaying the control element at a position at which the generated stroke was disposed when then the stroke was ascertained to correspond to the predetermined shape.

As an additional aspect of the invention, the invoking step comprises displaying the control element at a position corresponding to a position of the moving pointer element upon discontinued movement of the moving pointer element after the stroke was ascertained to correspond to the predetermined shape.

As another aspect of the invention, the invoking step comprises displaying the control element at a position corresponding to a last position of the moving pointer element upon discontinued contact of the moving pointer element on the display device after the stroke was ascertained to correspond to the predetermined shape.

As yet a further aspect of the invention, the invoking step comprises displaying the control element at a position that is a function of the position and orientation of the generated stroke and also is a function of boundaries of the display device so that the displayed control element is fully displayed within the display device.

As yet an additional aspect of the invention, the invoking step comprises displaying the control element at a position and orientation that is a function of the position and orientation of the generated stroke and also is a function of the position and orientation of other control elements displayed on the display device.

In accordance with another embodiment of the present invention, a method of activating a control element on a display device is provided that comprises the steps of invoking a control element on a display device in response to a generated stroke made using a moving pointer element; ascertaining a speed of movement of the moving pointer element during generation of the stroke; and establishing a manner of activation of the control element based on the ascertained speed of movement of the moving pointer element during generation of the stroke.

As an aspect of this embodiment, the ascertaining step comprises ascertaining whether the speed of movement of the moving pointer element corresponds to a relatively slow speed, a relatively moderate speed, or a relatively high speed.

As a further aspect of this embodiment, the establish step comprises establishing the manner of activation of the control element as being immediately activatable by subsequent movement of the moving pointer element if the speed of movement of the moving pointer element is ascertained to correspond to the relatively slow speed.

As another aspect, the establish step comprises establishing the manner of activation of the control element as being activatable by subsequent movement of the moving pointer element after discontinued movement of the moving pointer element if the speed of movement of the moving pointer element is ascertained to correspond to the relatively moderate speed.

As an additional aspect, the establish step comprises establishing the manner of activation of the control element as including placing the control element on the display device at a position disposed away from the moving pointer element and disposed behind a direction of travel of the moving pointer element if the speed of the movement of the moving pointer element is ascertained to correspond to the relatively high speed, and being directly activatable if the pointer element returns to the control element In accordance with a further embodiment of the present invention, a method of activating a control element is provided that comprises the steps of invoking a control element on a display device in response to a generated first stroke made using a first moving pointer element, the control element having a plurality of selectable command options; and activating one of the selectable command options as a function of a generated second stroke made using a second moving pointer element.

As an aspect of this embodiment, the first moving pointer element generates the first stroke by providing input to an input device, and the second moving pointer element generates the second stroke by providing input to said input device.

As another aspect of this embodiment, the display device is a multi-input display device and the first and second moving pointer elements generate the respective first and second strokes by contacting the multi-input display device.

As a further aspect of this embodiment, the invoking step comprises displaying the control element on the display device at a position that corresponds to a position of the generated first stroke.

As an additional aspect of this embodiment, the invoking step comprises moving the displayed control element to positions corresponding to positions of the generated first stroke during movement of the first moving pointer element.

Various other objects, advantages and features of the present invention will become readily apparent to those of ordinary skill in the art, and the novel features will be particularly pointed out in the appended claims.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE PRESENT INVENTION

The present invention pertains to graphical user interfaces that are particularly well-suited for large-scale digital display systems and multi-user interface technologies, particularly multi-touch systems. In such large-scale systems, it is common for two or more users to work side-by-side at the same display and, often, in different application environments. As mentioned above, placing "buttons" or horizontal or vertical menus along the top, bottom or sides of the display represents an ineffective graphical user interface for such large-scale and/or multi-user setting. Even dividing the display into separate "user areas" and providing buttons or menus along the edges of each user area represents ineffective use of space and terribly limits the flexibility otherwise afforded by large-scale/multi-user systems.

The present invention is described in connection with use of a multi-input or multi-touch device or display. However, it is appreciated that certain embodiments and variations of the present invention may be employed in connection with single-input display devices and also with displays that are not touch sensitive (i.e., are not input devices). Accordingly, reference to multi-touch or multi-input shall refer also to single-input and non-input type displays, where appropriate. Moreover, such input devices may receive an input via one or more fingers of a user and/or via one or more styluses or other mechanical, electro-mechanic, magnetic, optical, etc., devices. Still further, an input device may include, where appropriate, a non-contact type input device (e.g., an imaging system). References to a finger input or a finger contact (or other similar terminology) is for convenience only and is to be understood to include inputs in other manners including a stylus contacting an input-type display, use of a mouse, trackball, laser pointer or other similar device in connection with a non-input or input-type display, and other such types of inputs. Moreover, the display device may be in the form of a computer monitor, a television, a telephone screen, or other type of display, whether standalone or included with or incorporated within another component.

As used herein, the term "stroke" refers to a continuous track of position and, sometimes, pressure, tilt, angle, or other contact shape information over time, generally corresponding to the action of a user's finger, a stylus (e.g., on a single or multi-input display device, or on a non-display type device, such as a touch-pad), a mouse, a trackball or other input device. As discussed further below, multiple strokes (e.g., by multiple fingers and/or multiple users) can occur concurrently.

Loop Event

Figure 1A:
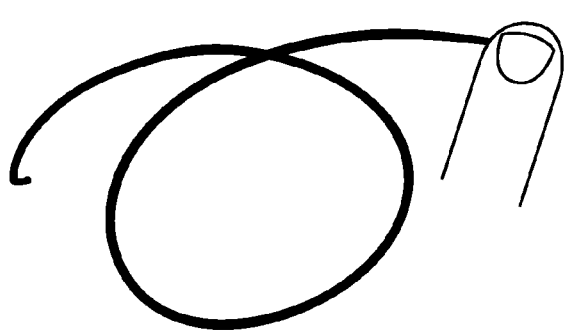
FIGS. 1A through 1D schematically illustrate two different types of "loop events" in accordance with the present invention.
Figure 1C:
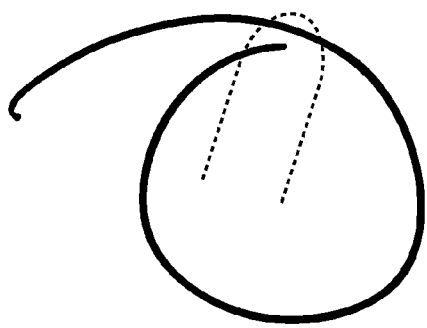
Figure 1B:
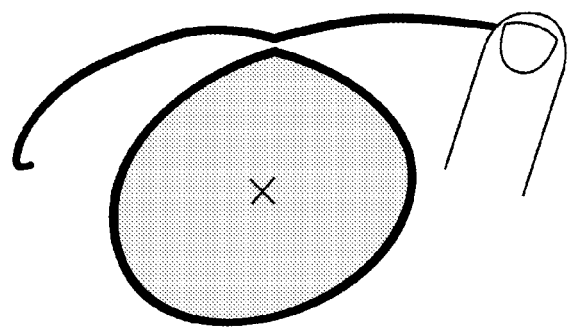
Figure 1D:
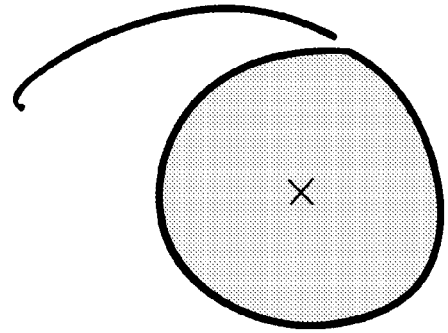

In accordance with the present invention, a stroke in the form of a loop operates as a command to activate a user interface element. FIGS. 1A through 1D of the drawings show two styles of "loop event." FIG. 1A shows a fully closed loop and FIG. 1C shows an approximate loop. Upon forming a loop or an approximate loop, the shape of that loop ("loop data") (e.g., shown in FIGS. 1B and 1D) is sent to a recognition system (e.g., a recognition software module). The recognition system analyzes the shape of the loop according to system-defined criteria, and depending on the results of that analysis, one or more user interface elements are activated. The gesture may also involve multiple strokes, such as a simultaneous two-finger "pinching" gesture, a short pair of parallel strokes, or a specific sequence of strokes, such as a calligraphic character.

During loop formation, it is preferable, although not critical, for the user's strokes (generally made on the "background" of a window environment) to generate a rendered trail as visual feedback. In one version, visual feedback (e.g., a rendered trail) is provided only after the recognition system ascertains that a substantial portion (e.g., 40%, 60%, etc.) of a loop has been generated. It may also be desirable for the recognition system to provide additional feedback to the user to confirm that the user is performing the gesture correctly. For example, a rendered trail in one color is provided during the stroke and the entire rendered trail (or the tail end thereof) is hi-lighted (or shown in a second color) after the recognition system ascertains that the loop event is being generated correctly.

The loop data may be sent to the recognition system as a continuous sub-section of the stroke, and can contain a combination of position, pressure, and timing information. The shape of the loop may be evaluated using simple quantitative criteria, such as bounding box dimension, path length, elapsed time, maximum pressure value, eccentricity, winding direction or other known techniques. These values are matched against a set of configurable thresholds to filter out unwanted or unnecessary input, and sent to a recognition engine to classify the loop type.

The loop may be recognized in various manners. In one version, the enclosed area of a loop with circumference C is compared to the maximal enclosed area $C^2/4\pi$ (a perfect circle with circumference C) to detect nearly-circular shapes. In another version, the outline is used as the input to a stroke recognition engine to classify it by shape type (e.g., star, circle, rectangle, etc.). In yet a further version, the recognition system identifies users by "signature shapes" that are associated with one or more such users. Since the term "loop" as used herein may vary in shape than that shown in the figures (e.g., be somewhat rectangular in shape, be a star shape, etc., or close approximation thereto), loop is defined herein to encompass any shape suitable to be recognized by a suitably designed/programmed recognition engine.

In a variation, the loop is a non-overlapping pattern, such as a semi-circle or other distinct, non-overlapping waveform (e.g., "V" shaped pattern, "W" shaped pattern, etc.). Similarly, a loop may be a partial oval or circle, or a partial (e.g., 80%, 95%) amount of another recognizable shape so that an interface element may be activated in advance of completing the shape.

While the invocation itself may be any of the forms mentioned above and others, a general criterion for the invocation command is that it should preferably involve gestures that are simple to make, but are unlikely to be made accidentally in the course of ordinary user motion. Particularly for novice users, an unexpected response can be as unhelpful as an overly difficult or undiscoverable operation. For example, the use of a simple "tap" gesture would be inappropriate in many cases, since this sort of input might be triggered by the user resting their fingers lightly on a touch screen, brushing their knuckle during another operation, bouncing a stylus, or simply tapping the screen to test out the sensor. In the case of the looping gesture in the form of a circle or oval and other waveforms, various thresholds, including minimum/maximum size and roundness (in the case of oval and circular forms) preferably are employed to prevent unintended triggering. For example, minute (i.e., very, very small) looping motion that naturally results from ordinary hand motion may otherwise cause an unintended trigger in the absence of a minimum size threshold. As another example, overly large looping activity, resulting from relatively long strokes that happen to self-intersect, may otherwise cause an unintended trigger in the absence of a maximum size threshold. Other thresholds may also be employed to minimize false triggers, such as a temporal threshold that sets a minimum and/or maximum time period in which the loop event must occur.

In accordance with an embodiment of the present invention, multiple sets of threshold ranges and classifiers are used to dispatch multiple event types. For example, a clockwise-formed loop activates a first "clockwise" menu, and a counter-clockwise-formed loop activates a second "counter-clockwise" menu. As another example, loops of relatively different sizes (e.g., large loop versus small loop) activate different user interface elements. As a further example, loops of different shape types (e.g., circle, rectangle) call up different menus. In yet another example, inverted and non-inverted forms of the same loop (e.g., "V" pattern versus inverted "V" pattern) activate different menus. In another variation of the present invention, if a "generic" loop is recognized, the system refines the event (performs a subsequent or secondary analysis) based on the particular qualities of the loop and the input stroke. For example, upon recognizing a generic loop, such as an oval loop (e.g., as shown in FIG. 1), the event or menu that is activated is a function of particular characteristics of the oval shape, e.g. its orientation or eccentricity.

The activation thresholds preferably are sufficiently broad to allow novice users to learn the activation command (sometimes referred to as "gesture") quickly, while minimizing accidental triggers (i.e., menu activations). For more experienced users, acceptable ranges and thresholds for these criteria may be narrowed so that activation is made more "precise," thus allowing for finer discrimination between activation gestures.

Menu Invocation

In accordance with a further embodiment of the present invention, any of the above-mentioned activation commands (referred to herein for convenience collectively as a "loop") invokes a marking menu selection interface, as schematically illustrated in FIGS. 2A through 2D of the drawings. Marking menus are a well-known user interface (UI) method that uses radial position to select from a circular pie menu of actions and commands. An exemplary publication that discusses marking menus is Callahan, J., Hopkins, D., Weiser, M., and Shneiderman, B, An empirical Comparison of Pie vs. Linear Menus, Proceedings of the SIGCHI Conference on Human Factors in Computing Systems (Washington, D.C., 1988), J. J. O'Hare, Ed. CHI '88, ACM Press, New York, N.Y., pages 95-100, which is incorporated herein by reference. In a variation, the marking menu selection interface has a non-circular shape, such as oval or rectangular, with a number of menu options preferably generally disposed radially around the menu's centroid.

In accordance with the present invention, the loop recognition action is closely integrated with a marking menu selection interface that includes a number of radial slices (e.g., 8 shown in the drawings) that correspond to different menu options. As further described below, menu options are selected in particular manners in accordance with different variations of the present invention, and generally depending on the particular manner of menu invocation and subsequent user input. Also, as discussed herein, menu invocation preferably should transition smoothly into the act of finding and selecting the desired menu option. Depending upon the form-factor of the surface, the user's physical drawing style, and the user's preferred interaction model, a variety of menu placement and activation schemes may be employed in accordance with the present invention.

Figure 2A:
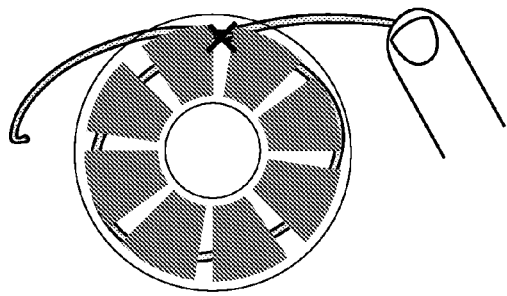
FIGS. 2A through 2E schematically illustrate various manners in which the menu may be invoked and positioned in accordance with the present invention.

FIGS. 2A-2E schematically illustrate, in accordance with the present invention, various manners in which the marking menu is invoked (i.e., called up and displayed) upon user implementation of a loop as described above. Referring first to FIG. 2A, this figure illustrates a first version in which the marking menu appears, when invoked, at the centroid of the enclosed portion of the loop. That is, the center-point of the marking menu is disposed at the centroid of the enclosed portion. As mentioned herein, the activated menu may be non-circular in shape (e.g., oval, rectangular, etc.) and in such case the centroid of the activated menu preferably is disposed at the centroid of the enclosed portion of the loop.

In the version described in connection with FIG. 2A, as well as various other versions described herein, as applicable, the marking menu is invoked at or immediately after the point of loop closure (represented by an "X" in FIGS. 2A-2D). In a variation, the marking menu is invoked when the user's finger (or stylus or other device) is stationary ("pauses") for a predetermined, relatively short period of time after loop closure. In yet another variation, the marking menu is invoked upon discontinuation of contact (e.g., the user's finger lifts away from the input display device) after loop closure.

Figure 2B:
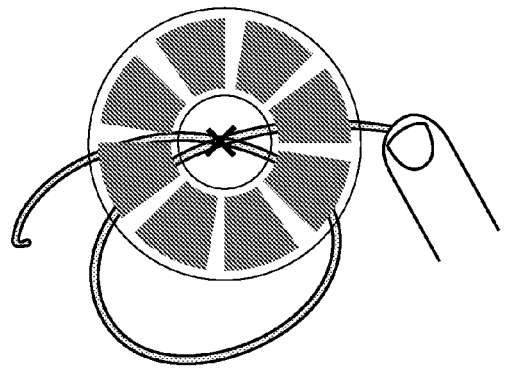

FIG. 2B shows a menu invocation version in which the center of the marking menu is disposed at the cross-over point. As mentioned above, the marking menu may be invoked at different periods of time, including at cross-over, upon finger movement pause (after closure), or upon discontinuation of contact (after closure).

Figure 2C:
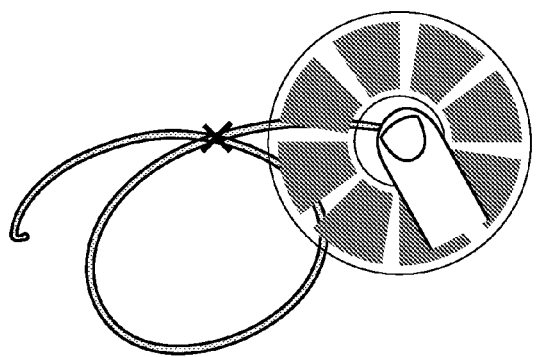

FIG. 2C shows a menu invocation version in which the marking menu is invoked upon finger movement pause (after-closure) and is disposed (i.e., its center is located) at the finger's current location at the pause.

Figure 2D:
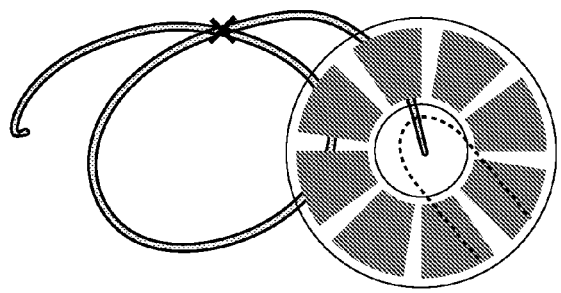

FIG. 2D shows a menu invocation version in which the marking menu is invoked upon discontinuation of contact (after-closure), as represented by the finger shown in dashed-lines. Also, as shown, the menu is disposed at the point of last contact.

In the variations shown in FIGS. 2C and 2D, the marking menu appears at a time and place when the user's finger is disposed within the menu's neutral or "home" region (i.e., at the menu's center position ). On the other hand, in the variation shown in FIG. 2A (independent of when the menu is invoked), the user's finger is disposed outside the menu's home region. In particular, the finger position is at the edge of the menu or completely outside the menu depending on when the menu is invoked, that is, depending of which version of FIG. 2A mentioned above is employed. As for the variation shown in FIG. 2B, the user's finger is disposed in the menu's home region in the case when the menu is invoked immediately at loop closure, but the user's finger is disposed outside the menu's home region for the cases of when the menu is invoked at finger pause or at discontinuation of contact.

In each of the variations of menu invocation discussed above, as applicable, menu placement may further depend on, or be a function of, particular characteristics of the user's input. For example, menu placement may be a function of the speed (and, optionally, acceleration) at which the loop is made. For instance, relatively slow movement may result in placement of the menu at a location at which the user can acquire it directly. But if the loop is made at a more, moderate speed, preferably decelerating, menu placement may be a function of when movement stops. And if movement is rapid (and/or erratic), the menu preferably is located at a time and position that minimizes mis-triggers (i.e., mis-activation of the menu, discussed further below). In such case, the menu preferably is positioned to require the user to bring movement (e.g., of his/her finger) under control before allowing the user to acquire the menu target (i.e., activate the menu, discussed further below). For example, placing the menu at a position relatively far from a current position of the user input (and behind a direction of travel) forces the user to bring his/her movement under control to access the menu.

Additional constraints may be applied to menu positioning. The menu position may be ascertained to ensure that the menu or portions thereof, including the options therein, do not appear outside the boundary of the display. The menu position may also be ascertained to ensure that it does not overlap other currently invoked menus. Menu placement and orientation may also be a function of the position and orientation of the gesture, the positions and orientations of recently displayed on-screen elements (e.g., objects, menus), important notification windows (i.e., that must remain fully visible) and objects that are actively being manipulated (most likely by another user), to prevent overlap and/or undesired/unnecessary obscuring of such other already displayed on-screen elements. The orientation of the menu may be assigned to match the orientation of the invoking gesture or other screen elements, which is particularly advantageous for a form factor where there is no natural definition of "up," such as a horizontal table device that is encircled by a number of users. Optionally, menu invocation is prevented. For example, menu invocation is prevented if its placement results in completely obscuring an already invoked menu, which is particularly advantageous to prevent a user from interfering with the operations of another user in a multi-user system.

Figure 2E:
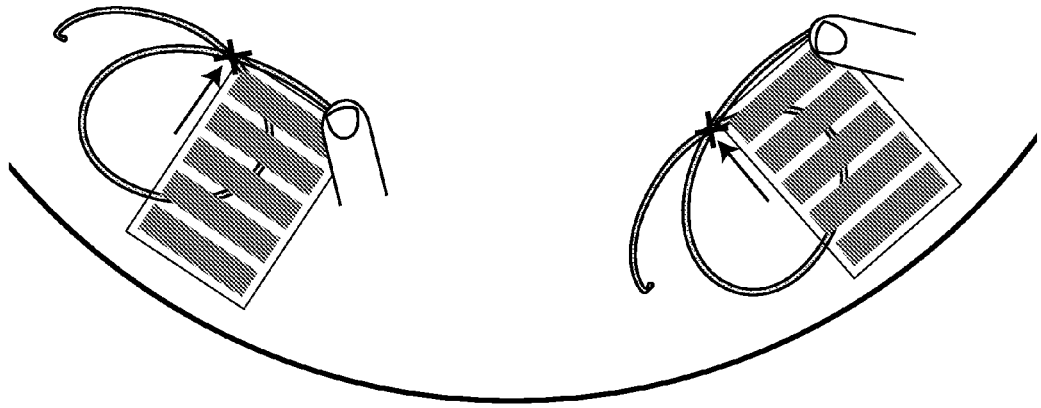

FIG. 2E shows two menu invocations from two concurrent users standing at different locations around a round, horizontal surface. For each invocation instance, the direction from the centroid of the loop to the point of loop closure is used to determine an upward direction for the position and orientation of rectangular list menus.

As discussed above, an activation command (i.e., a loop) invokes a marking menu selection interface or a variation thereof. In any of the embodiments and variations described, as applicable, different types of menus may be invoked. Moreover, the type of menu displayed or the selectable options or commands contained within the displayed menu may be a function of the context of the activation command. For instance, the type of menu displayed or the selectable options/commands within the menu may be a function of the object/environment beneath the finger position at the point of menu invocation. For example, a finger may contact an "empty" area, but subsequently move to an "occupied" area, thus causing a menu to be invoked that relates to the content of such occupied area. As a variation, the menu that is invoked relates to the content of the initial contact area. In such case, a user need not worry about invoking an undesired menu as a result of subsequent finger movement.

Menu Activation

In accordance with the present invention, the manner in which one of the displayed menu choices/options (e.g., the pie-shaped menu options shown in the figures) is selected, or activated, depends on whether the active pointer (e.g., user's finger) is disposed in the menu's home (i.e., center) region, the subsequent trajectory of the user's path and, optionally, other factors, as further discussed below with references to FIGS. 3A-3D.

Figure 3A:
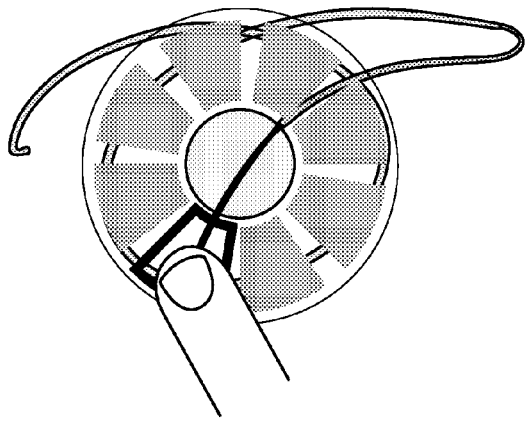
FIGS. 3A through 3D schematically illustrate various manners in which the invoked menu may be activated in accordance with the present invention.

FIG. 3A schematically illustrates a first menu activation version in accordance with the present invention. In the version of FIG. 3A, a user's finger position that initially is disposed outside the menu's home region (i.e., at menu invocation) is enabled to select a menu option after it enters the menu's home region. More specifically, if a menu is invoked (i.e., displayed) when the user's finger is located outside of the menu's home region, such as in the cases shown in FIGS. 2A and 2B (for 2 of the 3 variations for FIG. 2B described above), the user must slide the finger into the menu's home region and then slide the finger onto one of the displayed menu choices for that menu choice to be selected. By requiring entry into the menu's home region before enabling menu option selection, unintentional activation (called "mis-trigger" or "mis-activation" herein) caused by follow-through of the stroke is beneficially prevented. As briefly discussed above, quick or rapid movement (during the loop event) that invokes a menu followed by immediate menu activation may likely represent a mis-trigger of the menu. Hence, the menu activation version illustrated in FIG. 3A and select other variations prevent, or at least minimize, menu mis-activation.

In another menu activation version, although generally not preferred, the version shown in FIG. 3A as just described may be employed for cases in which the user's finger is located inside the menu's home region at menu invocation (not schematically shown in the drawings). This version, however, disadvantageously requires additional hand movement to select a menu option as compared to other menu option selection versions described below.

Figure 3B:
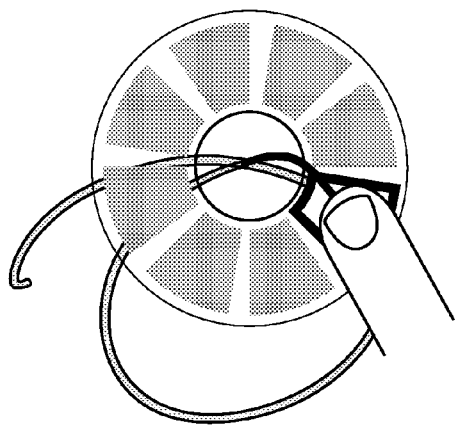

FIG. 3B schematically illustrates another menu option selection version in which the stroke that generated the loop immediately thereafter selects the menu option. Generally, this version is preferred for cases in which the user's finger is located inside the menu's home region at menu invocation, but also may be employed for cases in which the user's finger is completely outside the menu (i.e., not within the menu home region and also not within any of the menu's pie-shaped options). In a variation, and particularly for cases when the user's finger is located within one of the menu's options at the time of menu invocation, the stroke (e.g., finger) must completely go outside the menu (or go into the menu's home region) before menu option selection is enabled. In yet another variation, the stroke may immediately select any menu option except for the menu option that the finger initially is contacting at the point of menu invocation. To select the menu option on which the finger is initially disposed, the stroke must go completely outside the menu or into the menu's home region before that particular menu option may be selected.

Figure 3C:
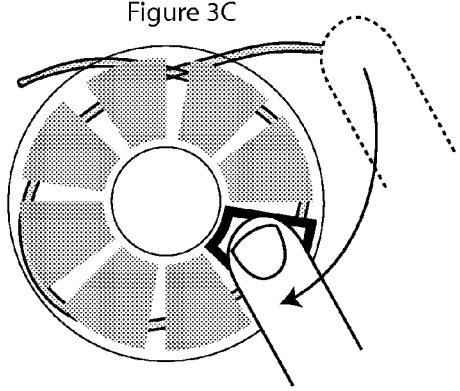

FIG. 3C schematically illustrates a further menu option selection version in which the user's finger discontinues contact with the input surface (i.e., the current stroke is lifted-represented by the finger in dashed lines), and then placed on the desired menu option to select it.

Figure 3D:
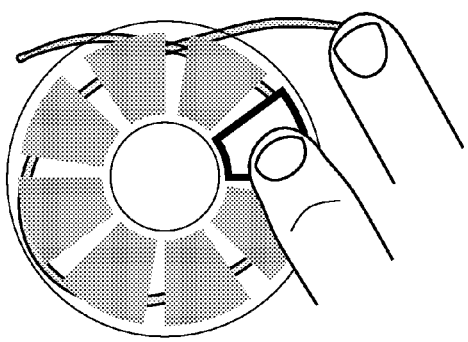

FIG. 3D schematically illustrates yet another menu option selection version in which an additional stroke (e.g., a second finger) is used to select the desired menu option while the original stroke (e.g., first finger) remains in contact with the surface.

Figure 4A:
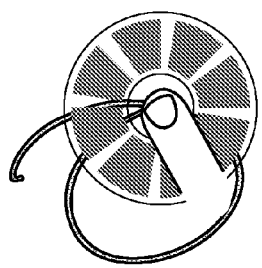
FIGS. 4A through 4C schematically illustrate an embodiment in which the invoked menu may be operated, moved and activated in accordance with the present invention.
Figure 4B:
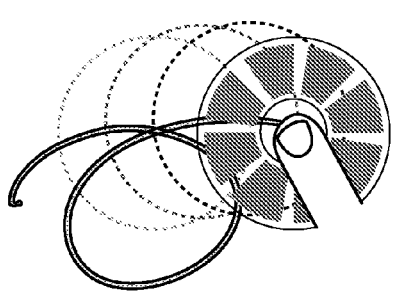
Figure 4C:
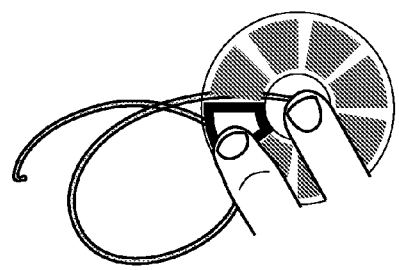

In accordance with the present invention, FIGS. 4A, 4B and 4C schematically illustrate a further embodiment in which the menu remains "attached" to the invoking stroke. More specifically, FIG. 4A schematically illustrates menu invocation at cross-over by a first stroke (e.g., a first finger). Then, as the invocation stroke continues to move, the tracking menu's position moves along with it, as shown in FIG. 4B. Finally, a second stroke (e.g., a second finger) selects a menu option, as shown in FIG. 3C. Optionally, after menu option selection, the menu remains displayed (i.e., invoked) while the first stroke remains in contact with the display, to allow for a second menu option selection via a third stroke (e.g., contact again by the second finger or a different finger). Three or more menu option selections are possible. In such variation, the menu options may change (generally depending on the application) after the first menu option selection.

In view of the foregoing, the use of multiple activation styles can accommodate continuous stroke-like style interaction, as well as a discrete set of tapping actions, as appropriate for user preference, physical deployment and/or sensor capabilities.

As described above, menu invocation transitions relatively smoothly into menu option selection and, in certain variations, this transition is carried out by a stroke implemented by a single finger input, and, in other variations, this transition is carried out utilizing two inputs, such as two adjacent fingers.

Any of the herein-described embodiments and multiple variations thereof may be employed multiple times, simultaneously, within the same user interface by the same user or by multiple users. Accordingly, the present invention is particularly well-suited for the parallel working environment, where multiple instances of menu invocation may be achieved simultaneously. For those instances that a particular menu must be invoked as a unique instance, additional invocations optionally may generate a brief error indication. Also, preferably, and as previously discussed, to prevent users from interfering with each other's actions, a system employing the herein-described graphical user interface may be adapted to prevent menu invocations that would overlap an existing instance.

Figure 5:
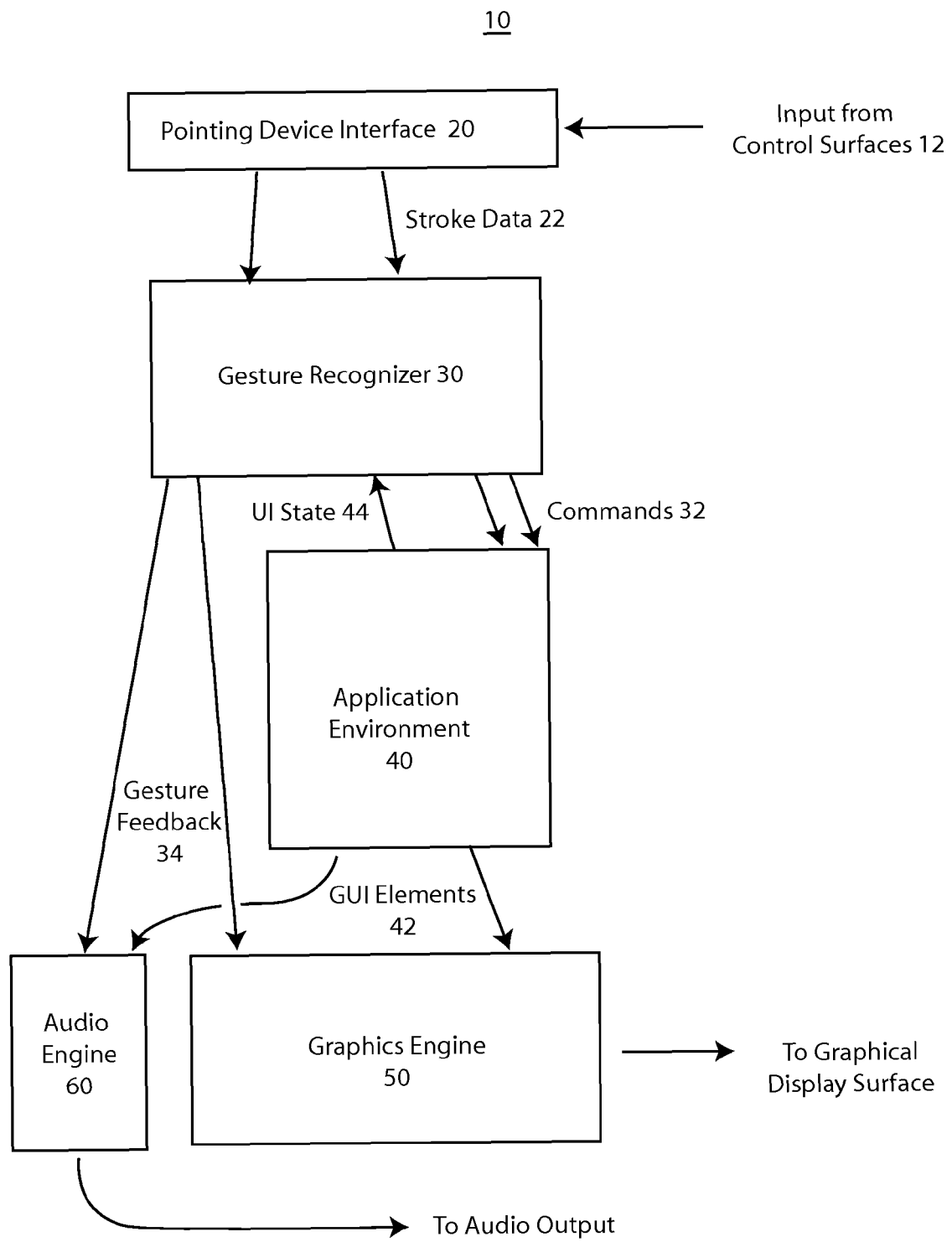
FIG. 5 is a schematic illustration of a system that may be employed in accordance with the present invention.

The present invention has been described as containing a number of embodiments and variations thereof, in terms of the characteristics of the loop event, menu invocation and menu activation. Each of these embodiments and variations may be implemented in a programmed based system that includes a suitable input mechanism and display device. With reference now to FIG. 5 of the drawings, a system 10 is shown in block diagram form that may be employed in the present invention. System 10 includes a number of components, which may represent separate hardware modules and/or software modules, as would be appreciated by those of ordinary skill in the art.

As shown in FIG. 5, system 10 includes a pointing device interface 20, a gesture recognizer 30, an application environment manager 40, a graphics engine 50, and an audio engine 60. Pointing device interface 20 receives stroke input from one or more pointing devices (or software emulation objects), each of which may report one or more point inputs. Pointing device interface 20 supplies the received input to gesture recognition engine 30 that processes the input by recording and analyzing the shape and character (i.e., other characteristics, such as those mentioned herein) of the incoming strokes. Gesture recognizer 30 ascertains if the input corresponds to an invoking pattern. If the input corresponds to such a pattern, that is, an invocation pattern is successfully detected, then gesture engine 30 transmits a command event to application environment 40, which manages application elements, and causes application environment 40 to invoke the appropriate menu or contextual response.

Application environment 40 may manage a wide variety of application-specific component objects that are controlled by and interact with one or more users. To represent the application elements to the user, application environment 40 maintains a collection of graphical user interface elements 42, which are supplied to graphics rendering engine 50 for display to the user on the appropriate graphics device and/or an audio engine 60 for audible feedback. Application environment 40 may also submit UI state information 44 to gesture recognition engine 50 to modify or enhance the capabilities of gesture recognition engine 30. It may also be advantageous to the system for gesture recognition engine 30 to provide audio/visual gesture feedback 34 to graphics engine 50 and to audio engine 60 in addition to any GUI feedback provided by the application.

Figure 6A:
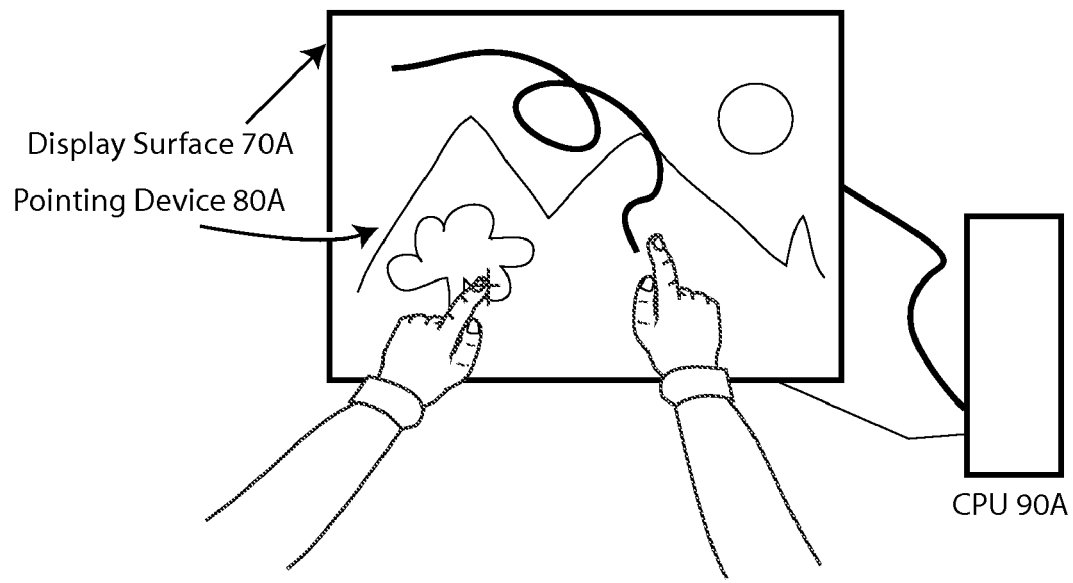
FIGS. 6A through 6D are schematic illustrations of various systems in which the present invention may be realized.
Figure 6B:
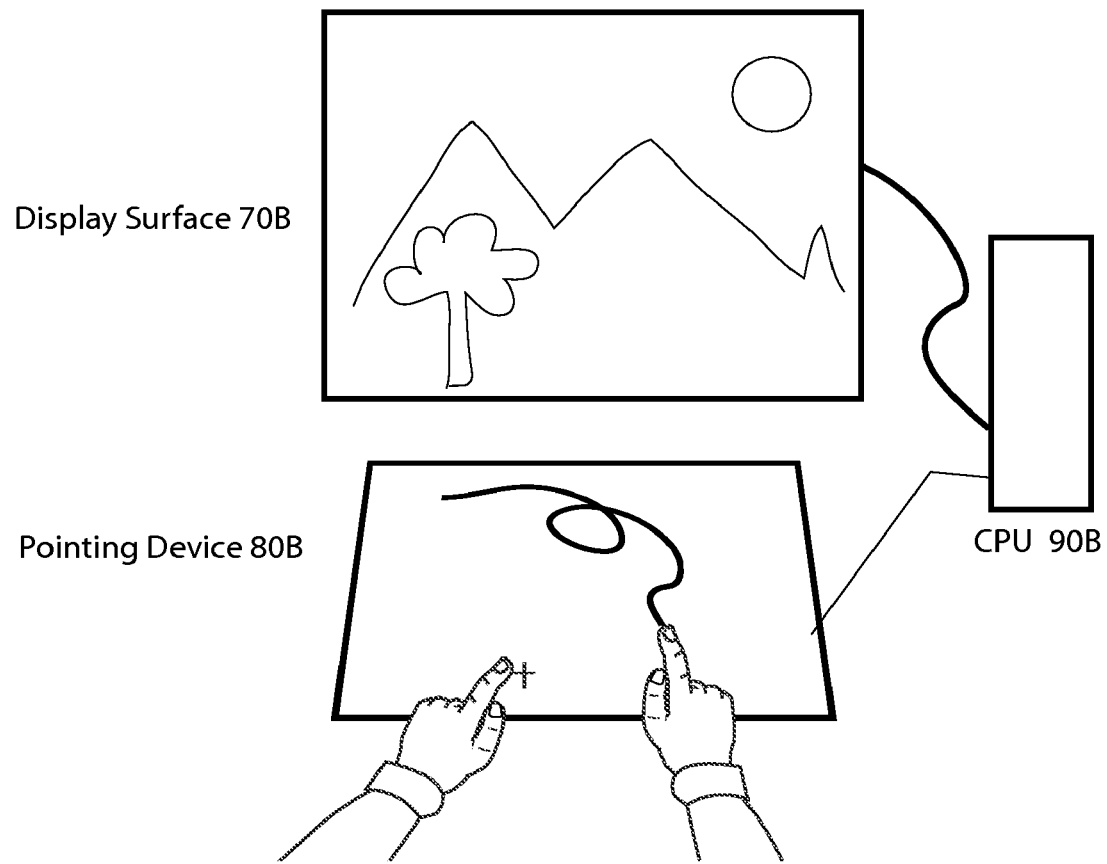
Figure 6C:
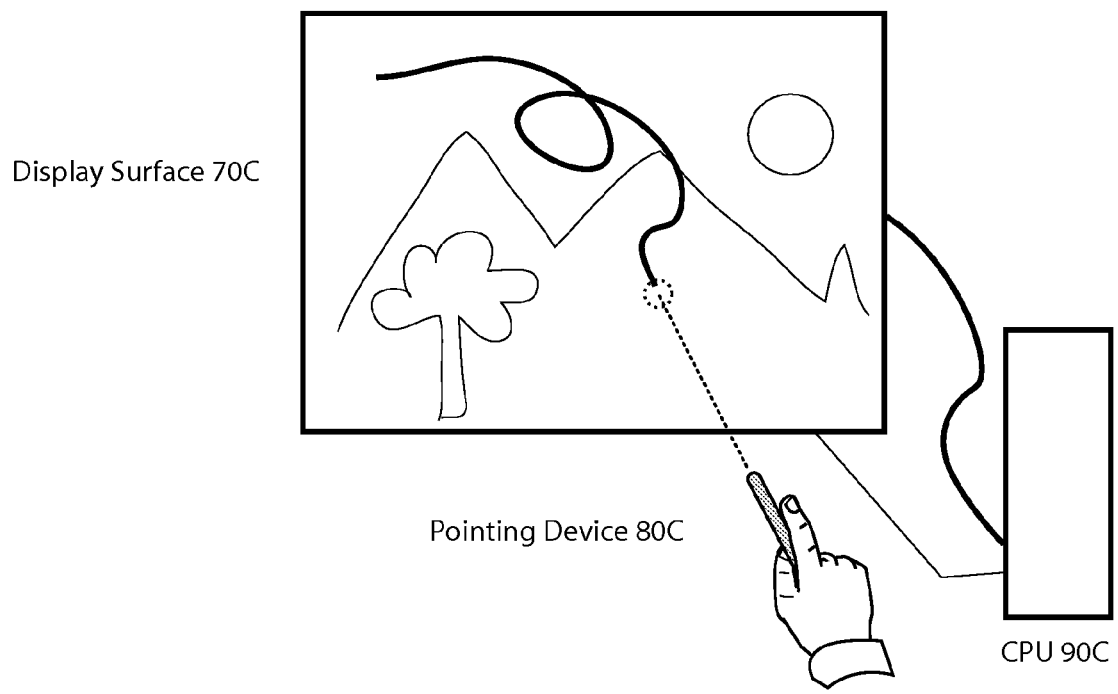
Figure 6D:
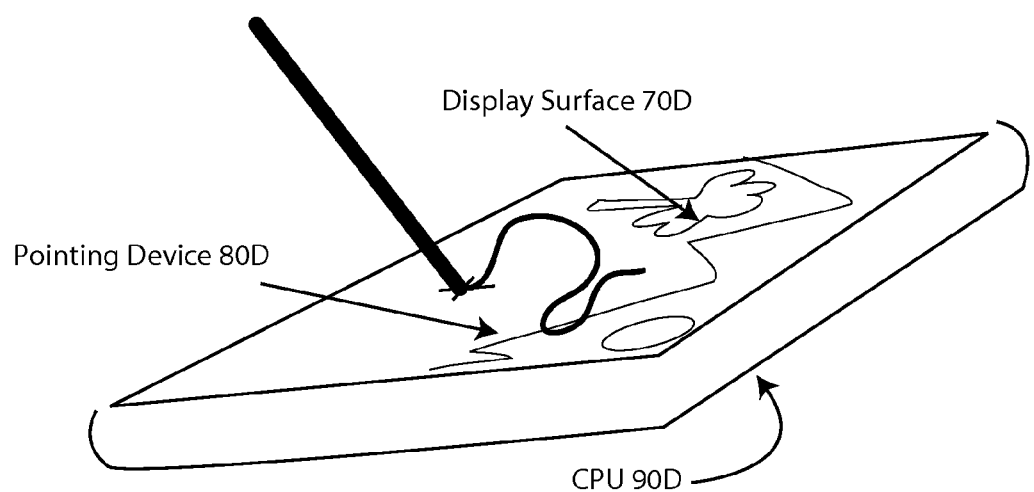

As previously discussed, the various embodiments described and the variations thereof may be embodied within a variety of devices and mechanisms. FIGS. 6A, 6B, 6C, 6D illustrate several physical embodiments (systems) in which the invention may be realized. Each system includes a graphical display surface, a device that can detect and track motion (e.g., touchscreen, mouse, trackpad, 3D motion tracker, stylus, laser pointer, and gyroscopic pointing device), and a controller capable of receiving input from the pointing device, processing the received input in accordance with one or more of the embodiments described herein, and to provide graphical elements and feedback to the display surface. As is appreciated, such devices may be embodied or incorporated within a single device or may be separate elements. For example, FIG. 6A is a schematic illustration that includes a graphical display 70A with integrated touch-sensing capability 80A, along with a separate control system (CPU 90A). FIG. 6B is a schematic illustration of another system that may be employed to carry out the present invention. As shown in FIG. 6B, three distinct devices are provided including a graphical display 70B, a distinct touch sensor 80B and a distinct CPU 90B. FIG. 6C shows yet another system that may be employed and that includes graphical display 70C with an integrated pointing system that employs a laser pointing device 80B, along with CPU 90C. As yet another example, FIG. 6D shows a completely integrated device that contains a graphical surface 70D, a pointing device 80D, and a CPU 90D. Of course, other variations of systems may be employed in accordance with the present invention.

Given the foregoing-described embodiments and variations of the present invention, in addition to the publication previously mentioned, additional publications that may be of interest include Hinckley, K., Baudisch, P., Ramos, G., Guimbretiere, F., "Design and Analysis of Delimiters for Selection-Action Pen Gesture Phrases in Scriboli," CHI 2005, 451-460 (2005); Kurtenbach, G., Buxton, W. "Issues in Combining Marking and Direct Manipulation Techniques," UIST '91, 137-144 (1991); Fitzmaurice, G., Khan, A., Pieké, R., Buxton, B., and Kurtenbach, G. 2003. "Tracking menus" UIST '03, 71-79 (2003); and U.S. Pat. No. 5,524,196 (1996), each of which is incorporated herein by reference. Technologies of interest include Alias Sketchpad, Xerox ToolGlass (e.g., U.S. Pat. No. 5,596,690).

The present invention has been described in the context of a number of embodiments, and multiple variations and examples thereof. It is to be understood, however, that other expedients known to those skilled in the art or disclosed herein may be employed without departing from the spirit of the invention.

Therefore, it is intended that the appended claims be interpreted as including the embodiments described herein, the alternatives mentioned above, and all equivalents thereto.

What is claimed is:

1. A method of invoking a control element on a display device, comprising the steps of:
    generating by a user a stroke on a display device using a moving pointer element;
    ascertaining, during generation of the stroke, a shape of the stroke;
    determining whether the ascertained shape corresponds to a predetermined shape; and
    invoking a control element based on whether the stroke is ascertained to have a shape that corresponds to the predetermined shape,
    wherein invoking the control element includes:
        determining a display location for the control element as a function of the shape of the stroke; and
        displaying the control element at the determined display location on the display device.

2. The method of claim 1, wherein the display device is a touch sensitive display device and the generating step comprises generating by the user the stroke on the display device by actuating the touch sensitive display device.

3. The method of claim 1, wherein the predetermined shape is a closed loop.

4. The method of claim 1, wherein the predetermined shape is a signature shape associated with the user.

5. The method of claim 1, wherein the stroke generated by the user is a subsection of a continuous sequence of input by the user using the moving pointer element.

6. The method of claim 1, wherein the generating step comprises generating by at least one user a plurality of strokes on the display device, each of the strokes using a respective moving pointing element.

7. The method of claim 1,
    wherein, after ascertaining that the stroke corresponds to the predetermined shape, the method comprises the step of conducting a secondary analysis of a characteristic of the stroke; and
    wherein the invoking step comprises invoking a first control element or a second control element based on results of the conducted secondary analysis.

8. The method of claim 1, wherein the ascertaining step comprises ascertaining if the stroke corresponds to either a first predetermined shape or a second predetermined shape; and the invoking step comprises invoking a first control element based on whether the stroke is ascertained to correspond to the first predetermined shape and invoking a second control element based on whether the stroke is ascertained to correspond to the second predetermined shape.

9. The method of claim 1, wherein the ascertaining step also ascertains a direction of travel of the stroke; and the invoking step comprises invoking a first control element based on whether the stroke is ascertained to correspond to a predetermined shape with a measurable clockwise or counterclockwise winding and that the ascertained direction of travel corresponds to a clockwise direction, and invoking a second control element based on whether the stroke is ascertained to correspond to the predetermined shape and the ascertained direction of travel corresponds to a counter-clockwise direction.

10. The method of claim 9, wherein the invoking step comprises invoking a first control element based on whether the stroke is ascertained to correspond to a closed loop with a measurable clockwise or counterclockwise winding and that the ascertained direction of travel corresponds to a clockwise direction, and invoking a second control element based on whether the stroke is ascertained to correspond to the closed loop and the ascertained direction of travel corresponds to a counter-clockwise direction.

11. The method of claim 9, wherein the invoking step comprises invoking a first control element based on whether the stroke is ascertained to correspond to a closed polygon with a measurable clockwise or counterclockwise winding and that the ascertained direction of travel corresponds to a clockwise direction, and invoking a second control element based on whether the stroke is ascertained to correspond to the closed polygon and the ascertained direction of travel corresponds to a counter-clockwise direction.

12. The method of claim 1, further comprising recognizing, during generation of the stroke, if the generated stroke corresponds to a substantial portion of the predetermined shape; and providing visual feedback on the display corresponding to at least a portion of the generated stroke if the generated stroke is recognized to correspond to said substantial portion of the predetermined shape, the visual feedback identifying to the user that the stroke being generated corresponds to a partial amount of the predetermined shape.

13. The method of claim 1, wherein the ascertaining step comprises ascertaining if the stroke corresponds to a predetermined shape and is within a predetermined size threshold; and the invoking step comprises invoking the control element based on whether the stroke is ascertained to correspond to the predetermined shape and the stroke is within the predetermined size threshold.

14. The method of claim 1, wherein the generating step comprises generating by a plurality of users respective strokes on said display device; the ascertaining step comprises ascertaining, for each of the strokes being generated, if the respective stroke corresponds to the predetermined shape; and the invoking step comprises invoking the control element for each ascertained stroke that corresponds to the predetermined shape.

15. The method of claim 1, wherein displaying the control element at the determined display location comprises displaying the control element at a center of the stroke that corresponds to the predetermined shape.

16. The method of claim 1, wherein displaying the control element at the determined display location comprises displaying the control element at a display location that is a function of the shape of the generated stroke and also is a function of boundaries of the display device so that the displayed control element is fully displayed within the display device.

17. The method of claim 1, wherein displaying the control element at the determined display location comprises displaying the control element at a position and orientation that is additionally a function of the position and orientation of the generated stroke and also is a function of positions and orientations of other control elements on the display device, of application objects present on the display device, or of the activity of other users of the device.

18. The method of claim 1,
wherein the shape of the stroke comprises a closed loop,
wherein determining the display location for the control element comprises determining a display location of a point on the loop where closure of the loop occurred, and
wherein displaying the control element comprises displaying the control element at the determined display location of the point on the loop where closure of the loop occurred.

19. The method of claim 1,
wherein the shape of the stroke comprises an enclosed area,
wherein determining the display location for the control element comprises determining a display location of a centroid of the enclosed area, and
wherein displaying the control element comprises displaying the control element at the determined display location of the centroid of the enclosed area.

20. The method of claim 19,
wherein displaying the control element comprises determining a display location of a centroid of the control element, and
wherein displaying the control element comprises displaying the control element such that the display location of the centroid of the control element coincides with the display location of the centroid of the enclosed area.

21. The method of claim 20, wherein the control element is a menu element having a plurality of selectable menu items.

22. A method of activating a control element on a display device, comprising the steps of:
invoking a control element on a display device in response to a generated stroke made using a moving pointer element, wherein invoking the control element includes:
ascertaining a speed of movement of the moving pointer element during generation of the stroke,
determining a location where the control element will be displayed on the display device as a function of the ascertained speed, and
displaying the control element on the display device at the determined display location.

23. The method of claim 22, wherein the ascertaining step comprises ascertaining whether the speed of movement of the moving pointer element corresponds to a relatively slow speed, a relatively moderate speed, or a relatively high speed.

24. The method of claim 23, further comprising establishing a manner of activation of the control element as being immediately activatable by subsequent movement of the moving pointer element based on whether the speed of movement of the moving pointer element is ascertained to correspond to the relatively slow speed.

25. The method of claim 23, further comprising establishing a manner of activation of the control element as being activatable by subsequent movement of the moving pointer element after discontinued movement of the moving pointer element based on whether the speed of movement of the moving pointer element is ascertained to correspond to the relatively moderate speed.

26. The method of claim 23, wherein determining a location where the control element will be displayed comprises determining a display location disposed away from the moving pointer element and disposed behind a direction of travel of the moving pointer element based on whether the speed of the movement of the moving pointer element is ascertained to correspond to the relatively high speed.

27. The method of claim 23, wherein determining a location where the control element will be displayed comprises determining a display location disposed away from the moving pointer element and disposed behind a direction of travel of the moving pointer element based on whether the speed of the movement of the moving pointer element is ascertained to correspond to the relatively high speed, and the control element being immediately activatable based on whether the pointer element returns to a predetermined active area of the control element.

28. The method of claim 22, wherein the ascertaining step comprises selecting the speed of movement of the moving pointer element from among a relatively slow speed, a relatively moderate speed, and a relatively high speed.

29. The method of claim 22,
wherein ascertaining the speed of movement comprises
determining that the speed corresponds to a relatively high speed or to a relative low speed, and
wherein determining a location where the control element will be displayed comprises:
determining a first location where the control element will be displayed if the determined speed corresponds to a relatively low speed, and
determining a second and different location where the control element will be displayed if the determined speed corresponds to a relatively high speed.

30. The method of claim 29, wherein the control element comprises a menu element having a plurality of selectable menu items.

31. A method of activating a menu element, comprising the steps of:
invoking a menu element on a display device in response to a generated first stroke made by contacting a first moving pointer element with a display surface of the display device, the display device being a multi-input display device and the menu element having a plurality of selectable menu options, wherein invoking the menu element comprises displaying the menu element and the plurality of selectable menu options on the display surface; and
activating one of the selectable menu options as a function of a generated second stroke made by contacting a second moving pointer element with the display surface, the second moving pointer element contacting the display surface to begin generating the second stroke before the first moving pointer element discontinues contact with the display surface to complete the first strike,
wherein the menu element is invoked at a position of the first moving pointer element when the first stroke was ascertained to correspond to a predetermined shape, and
further comprising translating the menu element on the display surface after invocation of the menu element based on movement of the first moving pointer element as the first moving pointer element completes the first stroke.

32. The method of claim 31, wherein the first moving pointer element generates the first stroke by providing input to an input device, and the second moving pointer element generates the second stroke by providing input to said input device.

33. The method of claim 31, wherein the invoking step includes displaying the menu element on the display device at a position that corresponds to a position of the generated first stroke.

34. The method of claim 33, wherein the invoking step includes moving the displayed menu element to positions corresponding to positions of the generated first stroke during movement of the first moving pointer element.

35. A system including
a display device; and
a processor configured to:
detect generation by a user of a stroke on the display device in response to user movement of a pointer element;
ascertain, during generation of the stroke, a shape of the stroke;
determine whether the ascertained shape corresponds to a predetermined shape; and
invoke a control element based on whether the stroke is ascertained to have a shape that corresponds to the predetermined shape,
wherein the processor being configured to invoke the control element includes the processor being configured to:
determine a display location for the control element as a function of the shape of the stroke; and
display the control element at the determined display location on the display device.

36. A method of invoking a menu element on a display device, comprising the steps of:
detecting generation by a user of a stroke made by the user contacting a moving pointer element with a display surface of the display device;
ascertaining, during generation of the stroke, a shape of the stroke;
determining whether the ascertained shape corresponds to a predetermined shape; and
invoking a menu element based on whether the stroke is ascertained to have a shape that corresponds to the predetermined shape,
wherein invoking the control element includes:
determining a location on the display surface where the moving pointer element discontinues contact with the display surface of the display device, and
triggering display of the menu element at a display location corresponding to the location of discontinued contact.

37. The method of claim 36, wherein the triggering of the display of the menu element at the display location corresponding to the location of discontinued contact comprises triggering the display of at least a portion of the menu element at the location of discontinued contact in response to the discontinued contact.

* * * * *